E. A. LUEKY AND R. N. HOUGHTON.
COINCIDENT MAXIMUM DEMAND RELAY.
APPLICATION FILED APR. 7, 1920.

1,378,884

Patented May 24, 1921.
5 SHEETS—SHEET 1.

Inventors
Erving A. Lueky
Roy N. Houghton
By William M. Swan, Attorney

E. A. LUEKY AND R. N. HOUGHTON.
COINCIDENT MAXIMUM DEMAND RELAY.
APPLICATION FILED APR. 7, 1920.

1,378,884.
Patented May 24, 1921.
5 SHEETS—SHEET 2.

Inventors
Erving A. Lueky
Roy N. Houghton
By William M. Swan, Attorney

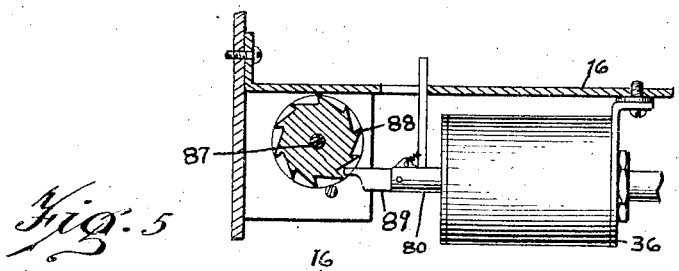
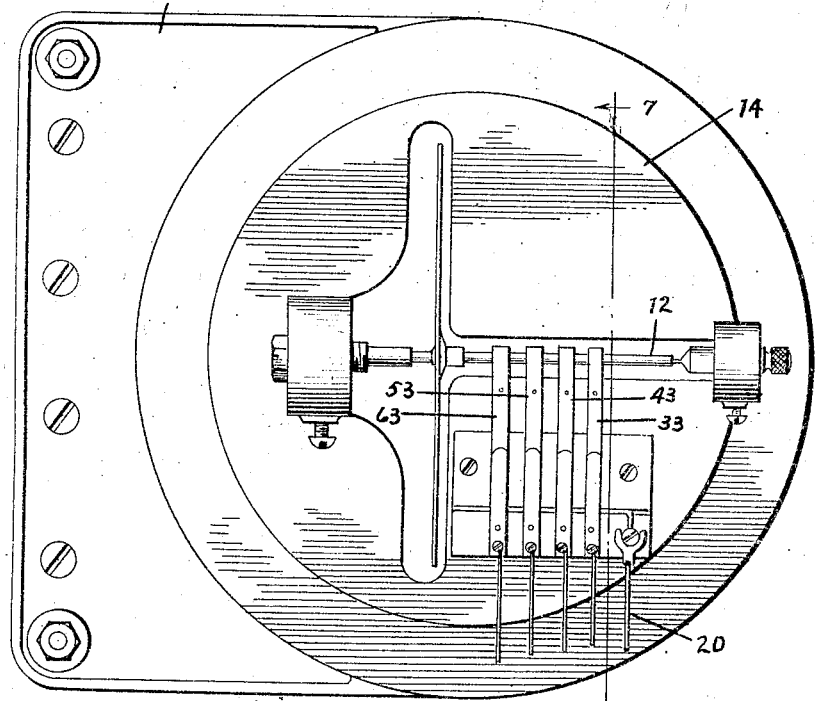
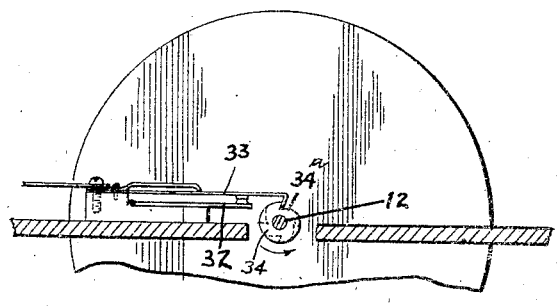

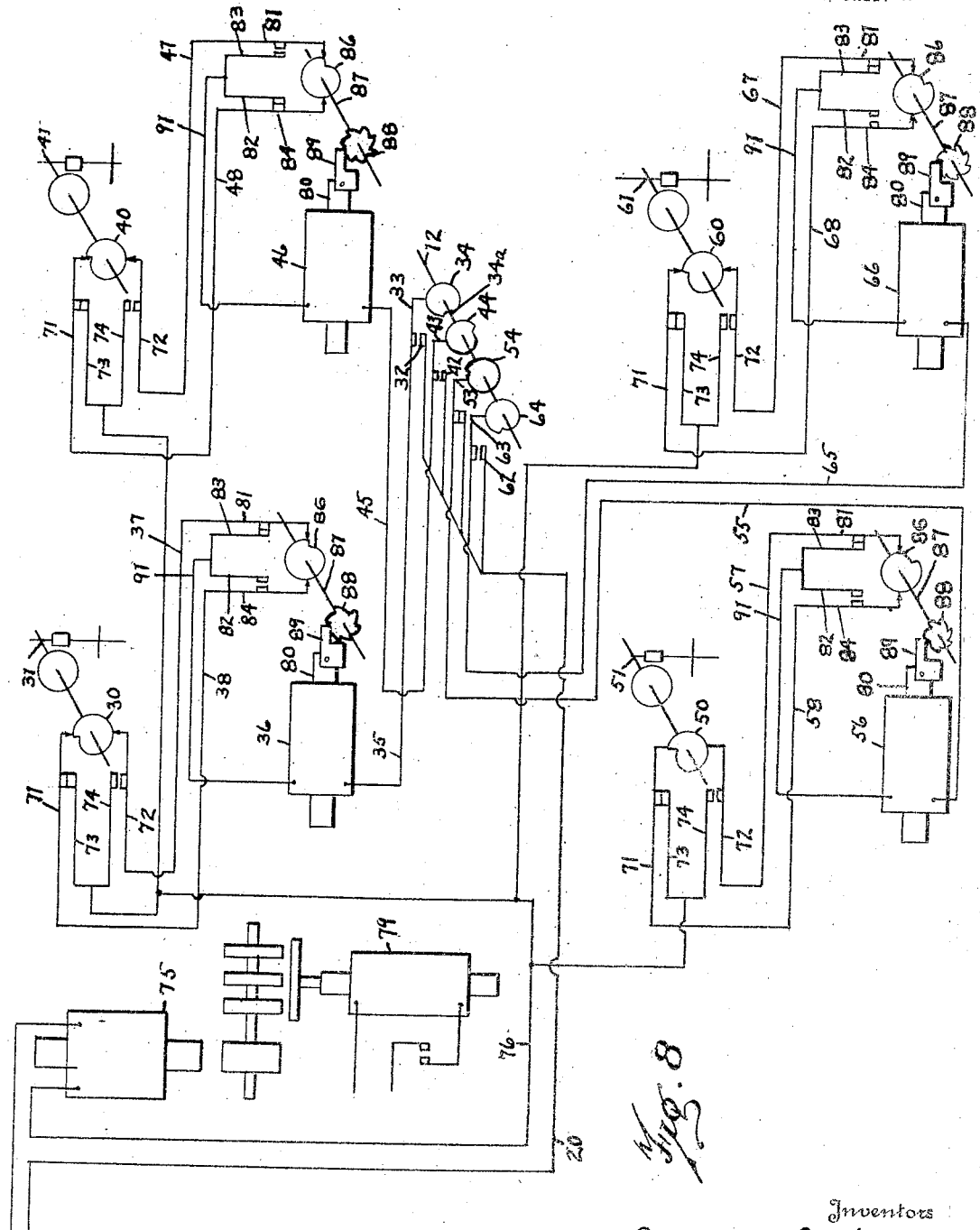

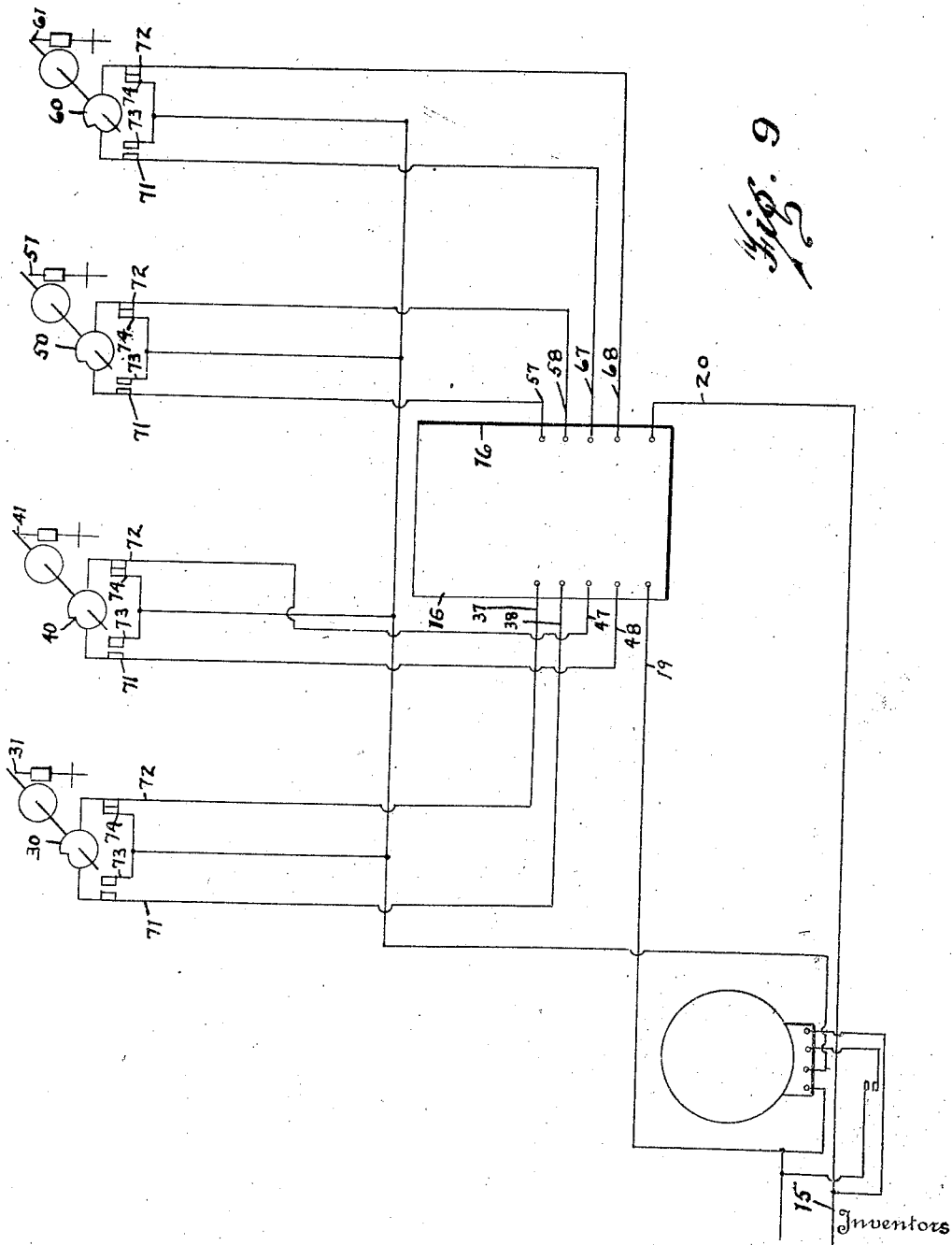

UNITED STATES PATENT OFFICE.

ERVING A. LUEKY AND ROY N. HOUGHTON, OF DETROIT, MICHIGAN.

COINCIDENT MAXIMUM-DEMAND RELAY.

1,378,884.  Specification of Letters Patent.  Patented May 24, 1921.

Application filed April 7, 1920. Serial No. 372,051.

*To all whom it may concern:*

Be it known that we, ERVING A. LUEKY and ROY N. HOUGHTON, citizens of the United States, residing at Detroit, county of Wayne, State of Michigan, have invented a certain new and useful Improvement in Coincident Maximum-Demand Relay, and declare the following to be a full, clear, and exact description of the same, such as will enable others skilled in the art to which it pertains to make and use the same, reference being had to the accompanying drawings, which form a part of this specification.

This invention relates to mechanism for totalizing and automatically recording at one operation the amount of electric power units supplied to a customer through a number of different meters, as for example, in a large factory, where, for reasons of administration and accounting between the several departments, each is furnished with a separate power line and meter therefor. Individual readings of the several meters involves a later compilation and clerical totalizing of the power units to be charged for, and not only involves appreciable trouble and time required for separate readings, but leaves the summing up open to a strong possibility of clerical error. Such efforts at totalizing devices as we are acquainted with have been open to the objection that no adequate provision is made in their mechanism for preventing a recording impulse from two or more of the circuits under measurement from registering on the totalizing devices at the same instant, and thus resulting in only a single impulse being given to the recording apparatus, whose unreliability at all points in a complete operative phase, because of this, has attained such a percentage total as to render the apparatus of limited value for its announced purpose. By the use of our apparatus such duplications and consequent inaccuracy of totalized readings have been reduced to a mere fraction of one per cent.

In the drawings:

Fig. 5 is a partly sectional elevation of an individual solenoid taken along the line 5—5 of Fig. 4, designed to bring out particularly the action of the solenoid in rotating the small shaft on which is mounted the make and break insulating cam for the contact members shown in the face of each relay in Figs. 1 and 2.

Fig. 6 is an elevational detail of the timing element or selector switch shown in the top portion of Fig. 1.

Fig. 7 is a partly sectional detail along the line 7—7 of Fig. 6, showing the relation of one cam on the meter spindle to the corresponding spring contacts.

Fig. 8 is a diagrammatic perspective showing the wiring and contacts of each solenoid in relation to the totalizing and recording mechanism.

Fig. 9 is a diagrammatic showing of the relation of the wiring contacts of each solenoid disassociated from the close relation which they occupy in the shell of the completed apparatus.

Each of the individual or contributing circuits, whose measurement of current used it is desired to totalize by means of our apparatus, is of course to be understood as having its own contact register, of any well known type. Each of the circuits is connected by suitable circuit wires with the totalizing mechanism, illustrated as regards its wiring and solenoid connections in Fig. 1, and illustrated in diagrammatic perspective in Fig. 8. The period of time in such a device, during which the contacts on an individual register are in circuit, generally varies, as is well known, from two to five seconds when under full load, and any one of the individual spindles 31, 41, 51 and 61 shown in Fig. 8 may be understood as of this type, whereas the selector switch or motor of the totalizing device, whose spindle is shown at 12, is so arranged as to have its cycle of rotation of about one second duration; in other words, the central feature of our apparatus for preventing the registration from two or more circuits at the same instant of time, is the fact of there being such a variance between the cycle of operations of the individual meter register spindles and of the selector switch, or timing element, that, aided by the other parts shortly to be described, makes impossible such simultaneous circuit closing by the selector switch or timing element, as would permit recording.

Figure 1:
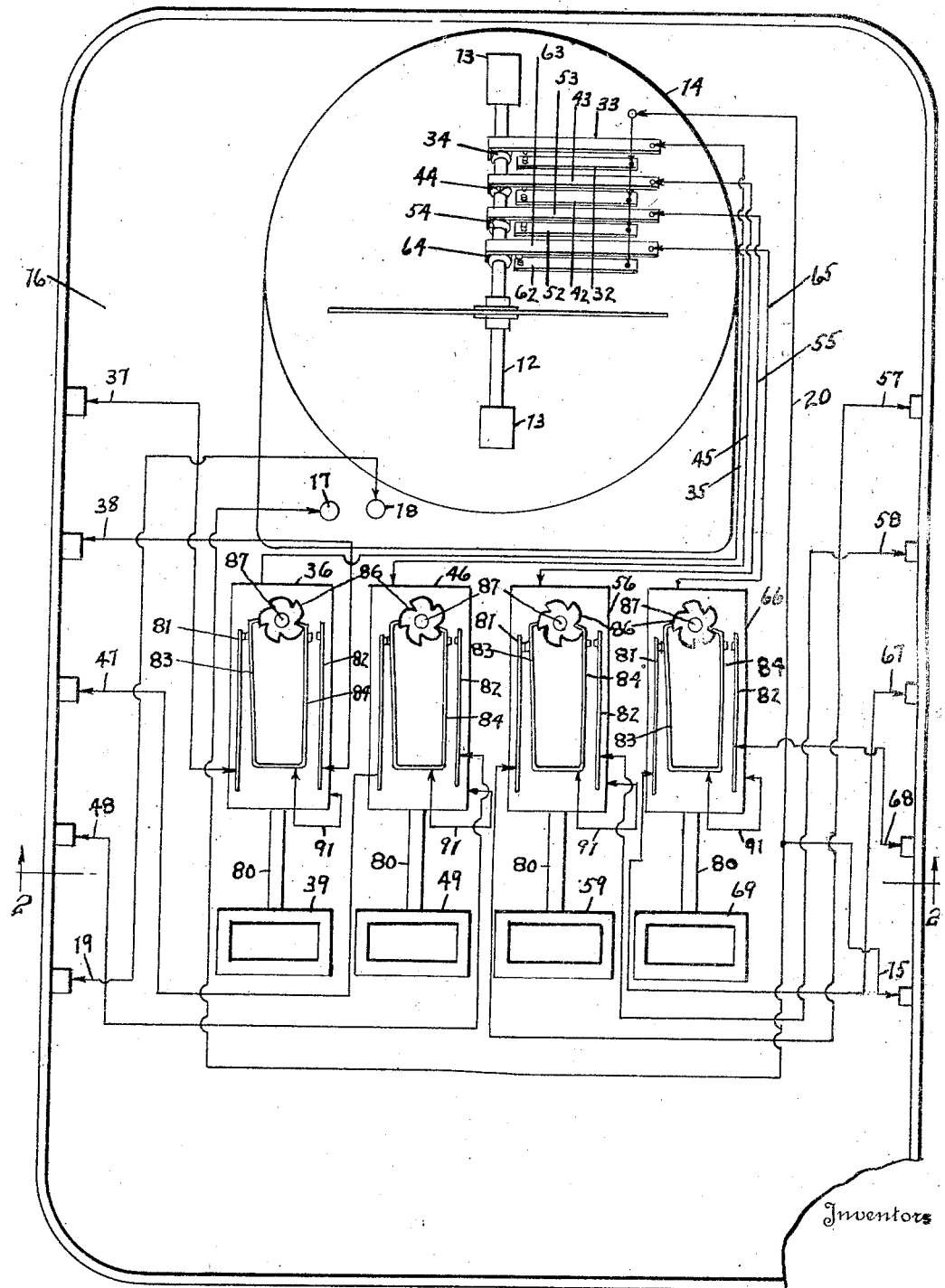
Figure 1 is a front or facial elevation of our improved mechanism, with such parts as the wiring shown diagrammatically, and some of the recording mechanism shown elevationally.
Figure 2:
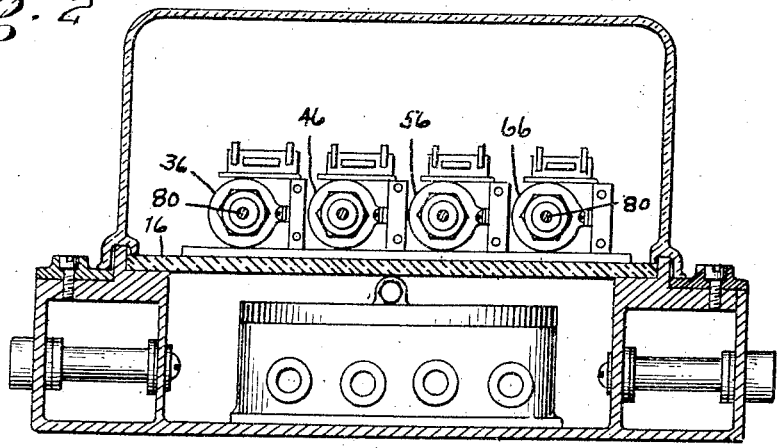
Fig. 2 is a sectional view along the line 2—2 of Fig. 1.

With this outline of the theory of our device, let it be understood that in Fig. 1, 15 represents the common entering wire, which extends to the binding post 17 leading to the motor for the selector spindle 12, not shown in Fig. 1 because it lies directly behind the solenoid members. From the motor the current passes out through the binding post 18 and the outgoing wire 19. A branch 20 of the entering wire 15 also extends to connection with each of the lower contact pieces 32, 42, 52 and 62, which, like the selector switch spindle 12, are shown through the window 14 in the insulating platform or shelf 16, whereon other parts of the mechanism, which will be described later, are mounted. As brought out particularly in Figs. 7 and 8, the studs of each of these lower contact pieces are normally out of contact with the complementary spring pieces 33, 43, 53 and 63, only one at a time being in contact. The bent over ends of these spring pieces ride upon one or the other of the hard rubber cams 34, 44, 54 and 64, which are spacedly mounted on the motor spindle 12, with their notched or low portions 90° apart, and which are adapted to act successively and in timed relation on the contact ends 33, 43, 53 and 63, to make and break their contact with the corresponding lower contact pieces 32, 42, 52 and 62.

Each of these spring contact pieces 33, 43, 53 and 63 is connected by a corresponding wire 35, 45, 55 or 65 with the corresponding one of the solenoid members 36, 46, 56 and 66, whose wire connections with their respective individual circuits are shown at 37, 47, 57 and 67 and at 38, 48, 58 and 68, while the corresponding recording members for the several solenoids are shown at 39, 49, 59 and 69. As brought out in diagrammatic Fig. 8, each solenoid as just described is electrically connected with its corresponding contact meter register, as 31, by means of its circuit wires 37 and 38. Associated with each meter register are placed two pairs of contact switches, as 71 and 72, and 73 and 74, arranged one within the other, so that when the pair 71 and 73 are in contact, the pair 72 and 74 are out of contact, and vice versa. These contact switches are actuated so as to form pairs as just described by the action of the several cams 30, 40, 50, and 60, respectively, which, carried as they are on the spindles 31, 41, 51 and 61, respectively, are rotated in the desired time cycle so as to make and break the contacts 71 and 73, and 72 and 74, according to the cycles of the several individual circuits, and, as brought out in Fig. 8, these several cams are so mounted on their corresponding spindles as to act successively; cam 30 is shown with the tip of its contact switch 71 just about to drop from the high point of the cam; the tip of the corresponding contact switch 71 has just dropped over the tip of the high point on the cam 40, etc. When the solenoid, as for example, 36, is energized, thus raising its plunger 80, it forces a contact between either the pair of switch members 81 and 83 or 82 and 84, thus completing a part of the two way circuit, the still incomplete circuit over the new alternative path being completed by the action of the meter on the spindle. When this has taken place, an energizing circuit has been completed for actuating the printometer 75, or equivalent recording mechanism, to connection with whose common wire 76 each one of the wires 38, 48, 58 and 68 leads. Thus each solenoid, actuatable as and when its corresponding pair of contact pieces, as for example, 33 and 32, are in engagement, affords two equivalent and alternative paths, one through the spring switches 81 and 83 and the other through the spring switches 82 and 84, through which the current from its individual circuit can pass, each constituting, when active, a portion of, for example, the circuit 37, 38, whose contribution to the total current used has already been measured by its corresponding meter register spindle 31. But as stated, this circuit is interrupted every time the hard rubber cam 86 has acted upon either of the pairs of spring switches 81 and 83, or 82 and 84, and this breaking or shifting over occurs whenever the closing of the circuit between the contacts 32 and 33 has resulted in energizing the solenoid and consequently raising its plunger 80 so that its pointed finger has engaged and rotated the gear 88 and consequently the hard rubber cam 86.

Figure 3:
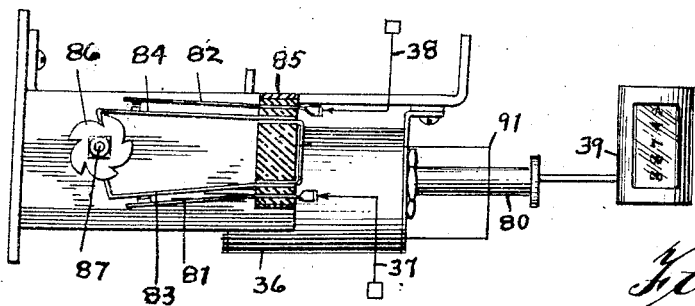
Fig. 3 is a detail elevational view of a single solenoid and its make and break switches, shown in relation to its corresponding recording member.
Figure 4:
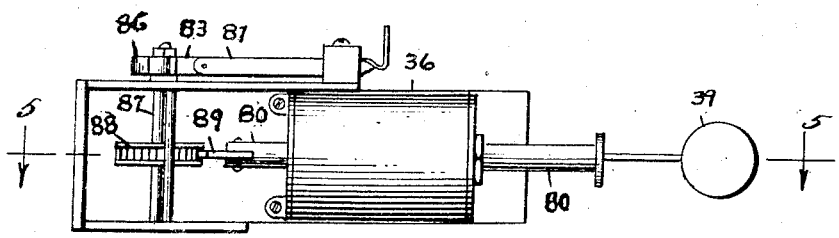
Fig. 4 is a detail view, similar to Fig. 3, taken along the line 3—3 thereof.

Each of the solenoid units is mounted upon the insulating platform 16, with its pair of wires, as for example, 37 and 38 (see particularly Fig. 3) having connection with the contact switches 81 and 82 of the solenoid 36. Mounted upon a suitable insulating block 85 which also supports them, interiorly of the switches 81 and 82, are the hooked or terminally bent contact springs 83 and 84, whose inturned points are adapted to be engaged by the insulating cam 86 mounted upon the shaft 87, which shaft also carries, rearwardly of the cam 86, the ratchet 88, which is adapted to be engaged by the spring-held and pivoted finger 89 on the upper end of the solenoid plunger 80. The springs 83 and 84 are overlapped at their bottom portions beneath the insulating block 85 in a way to make a generally U-shaped member, and are connected by means of the wire 91 with the windings of the solenoid; and thence with either the wire 37 or 38, according to the open or closed condition of the pair of switches 81 and 83, or the pair 82 and 84, which are adapted to be moved into and out of contact with one another by the rotative movement of the hard rubber cam 86. When the tip of one of the springs 83 and 84 is riding on a high point of the cam, it is forced laterally to a degree sufficient to engage the stud on the tip of the contact switch 81 or 82, while at the same time, the tip of the opposite spring member, as 84, is brought to engagement against a low point of the cam, and thus inclines so far inwardly as to be out of contact with its neighboring contact switch 82. Each time that the shaft 87 is rotatively actuated, as described, by the rise of the plunger 80, as the solenoid is energized, the hard rubber cam 86 is rotated sufficiently to reverse the open and closed positions of these pairs of switches, just described, thus breaking the circuit passing through them, and diverting the path of the current into the other and equivalent branch constituted by the switch pieces 82 and 84, or vice versa. Whichever path the current is traversing, it proceeds, after the momentary shifting of the paths just described, through the crossover wire 91, which is connected with the common base portion of the springs 83 and 84, to a connection with its corresponding wire, as 35, leading to the spring piece 33, whose bent over end, as already described, has been riding on its hard rubber cam 34 on the motor spindle 12. During the brief interval that the spring piece 33 has fallen onto the low or notched part 34ª of its cam 34, this spring has been in contact with its corresponding lower contact piece 32, and accordingly there has been an uninterrupted path for the current entering through the common wire 15. But almost immediately the tip of the spring 33 is again raised by the continued wiping action of the cam 34, the remaining portion of whose periphery is uniformly high as contrasted with the notch 34ª. There being four of these hard rubber cam pieces, as 34, 44, 54 and 64, spacedly arranged on the motor spindle 12, and with their notched portions substantially 90° apart, each of the spring pieces 33, 43, 53 and 63 are forced to ride on a high part of their corresponding cam, and thus be out of contact with their corresponding subjacent pieces 32, 42, 52 and 62 through more than three-quarters of the rotative cycle of about one second of the motor spindle 12 whereon they are mounted. When, however, any one of them drops down, and thus completes a circuit with the corresponding lower contact pieces 32, 42, 52 and 62, this causes a closing of its solenoid circuit, provided enough current has gone through the corresponding individual circuit as 37, 38, to actuate its meter spindle, as 31, through one unit. If not enough current has gone through this particular circuit to move its meter spindle this much, no energization of the solenoid takes place, even though the corresponding contacts 33 and 32 have been closed, as just described, and consequently no contribution to the totalizer's actuation is made from that circuit at that time. This energization of the solenoid raises its plunger 80, so that the pivoted finger 89 engages the ratchet 88, thus effecting the rotation of the shaft 87 and consequently throwing the hard rubber cam 86 over, and changes the path of the current passing through the circuit, as through the wires 37 and 38, from, for example, the members 81 and 83 to the members 82 and 84. This open position of the spring contact pieces 32 and 33 (or the corresponding members of other pairs) lasts through at least three-quarters of the full second comprising the cycle of rotation of the motor spindle 12, and there being, as herein illustrated, four sets or series of these members, equidistantly arranged about the motor spindle 12, it presents a strong contrast with the at least two second phase of the individual meter contact spindle on any one of the several circuits, so that the impulse from one must be fully received and recorded before the impulse from another can pursue its actuating path.

Each contributing circuit is thus enabled to act through its solenoid upon its individual recording mechanism, as 39, and in addition is connected electrically with a timing and totalizing printometer 75, operable only as and when its energizing circuit is permitted to be closed by the engagement against the tips of its spring pieces 33, 43, 53 or 63 against the low point of their corresponding cams 34, 44, 54 or 64, to effect the energization of its solenoid, so that its plunger will actuate the recording mechanism one unit.

What we claim is:

1. In an electrical totalizing and recording mechanism, in combination with a plurality of individual circuits each provided with a contact meter register, a corresponding number of solenoid members each appurtenant to one or the other of said individual circuits, means appurtenant to each solenoid and adapted to be actuated by the movement of the plunger thereof, whereby the path traversed by the current through its corresponding circuit may be varied, a timing element having peripherally diverse contact surfaces, make and break contact elements connected with each solenoid member and adapted to be successively actuated to open and closed position by the engagement of said contact surfaces of the timing element, thereby energizing the several solenoids and effecting a movement of the plunger of each solenoid, a recording member for each solenoid, and a totalizing recording member adapted to receive impulses from the several individual circuits synchronously with the action of the timing element.

2. A totalizing mechanism for a plurality of contemporaneously active circuits, comprising a series of solenoid members, an individual current circuit appurtenant to each solenoid, each circuit having its own contact meter register, a timing element and a circuit for rotatively energizing the same at a predetermined speed, normally inactive means for successively connecting said timing element with said solenoids to effect their energization, whereby their plungers are actuated, recording members adapted to be engaged by said solenoid plungers, and a common recording member for the several circuits, the protection whereof against the contemporaneous receipt of impulses from a plurality of circuits is afforded by said timing element and its connections.

3. In an electrical totalizing and recording mechanism, in combination with a plurality of individual circuits, a timing member with which each circuit is adapted to be operatively connected, a solenoid member interposed between each individual circuit and the point of contact between its terminal and the spindle of said timing member, and means appurtenant to each of said solenoids whereby a current from its corresponding individual circuit may be selectively directed into one or the other of equivalent energizing paths about the solenoid, and means on the timing member for successively making and breaking the contacts of the circuits leading theretoward from the individual circuits and the solenoids, whereby the possible registration of their several impulses is according to a variant time unit from that prevailing in the individual circuits.

4. A totalizing mechanism for a plurality of electrical circuits, having in combination with a timing element having a plurality of selectively located contact surfaces on its stem, a corresponding series of contact members adapted to be successively engaged by one or the other of said contact surfaces as the stem rotates, a current wire leading to each contact member, a second series of contact members with respect to which the first named series of contact members are adapted to be placed in and out of engagement according to the position of each relatively to its contact surfaces on the spindle, a current wire common to all of said second series of contact members, a series of solenoid members with each of which one of said current wires is connected, and individual circuits adapted to follow either of two equivalent paths relatively to said solenoid according to the actuation thereof due to the making and breaking action of the timing element on the connections to the several solenoids, and means for recording the activities of the several circuits.

5. A totalizing mechanism for a plurality of contemporaneously active circuits, having in combination with a corresponding series of solenoid members adapted to make and break said circuits, thereby diverting the current through either one of a pair of equivalent paths, a timing element having a different operative cycle from that of the meter registers of the several constituent circuits, and means connecting said timing element with the several solenoid members whereby they are actuated in timed sequence to effect the making and breaking of said circuits, and a totalizing recording member adapted to be protected by the action of said timing element against the contemporaneous action of a plurality of circuits.

6. A totalizing mechanism for electrical circuits, having in combination with a plurality of individual circuits each provided with a meter register, a solenoid mechanism appurtenant to each circuit, a corresponding number of recording members adapted to be engaged by the solenoid plungers as the same are actuated, a timing element, connections between selectively located points on said timing element and each of said solenoid members whereby they are actuated in timed sequence, thereby making and breaking their corresponding circuits, and a totalizing recording mechanism potentially connected with each of said individual circuits.

7. In a totalizing mechanism for a plurality of contemporaneously active circuits, in combination with a timing element having a predetermined rate of rotation, a solenoid member appurtenant to each of the circuits to be metered, means successively connecting said timing element with said solenoid members whereby they are momentarily energized, means operatively connected with each solenoid whereby at each energization thereof the current from its corresponding circuit is broken and diverted through an equivalent path, recording members adapted to be actuated in timed relation according to the activity of the several circuits.

8. In a totalizing mechanism for a plurality of electrical circuits, in combination with a solenoid member appurtenant to each circuit, means adapted to be actuated by the movement of the solenoid plunger whereby its current is momentarily broken and diverted through an equivalent path, a recording member for each solenoid, a timing member having potential connections with each circuit whereby the energization of each may be transmitted in timed relation, and a common recording mechanism the timing of whose actuation is regulated by the action of the timing element on their related parts.

9. A totalizing mechanism for a plurality of individually metered circuits, having in combination a solenoid member appurtenant to each circuit, a timing member having make and break connections with each solenoid whereby the several solenoids may be operated in succession at desired time intervals, a circuit for actuating said timing member, alternative switch connections for each of the individual circuits, adapted to be actuated by the movement of the corresponding solenoid plunger, thereby momentarily breaking the flow of the individually metered current therethrough, and recording members for said individual circuits and for the associated group of circuits.

10. A totalizing mechanism for a plurality of contemporaneously active circuits, comprising a timing member, means for rotatively actuating the same at a predetermined speed, make and break circuit connections adapted to be actuated in timed relation by engagement against selected portions of said timing member, a solenoid appurtenant to each circuit, a plurality of alternative paths for the current of each circuit, each potentially constituting a part thereof, one of which is adapted to be rendered active and the other of which is adapted to be temporarily thrown out of action by the movement of the solenoid plunger when the same is energized by the closing of the timing circuit, and a totalizing recorder whose receipt of impulses from the several circuits is guarded by the action of said timing member.

11. In a totalizing mechanism for individually metered circuits, in combination with two-way switch connections for each circuit, a solenoid appurtenant to each pair of switch connections, a timing member potentially connected with each of said solenoids and adapted to permit the energization thereof in timed sequence, a recording member for each circuit adapted to be actuated by the movement of the corresponding solenoid plunger, and a totalizing recorder adapted to receive impulses from each circuit in timed sequence under the regulating action of said timing member.

12. A totalizing mechanism for a plurality of contemporaneously active circuits, comprising a solenoid member appurtenant to each circuit, a common timing element having a cycle of operations variant from that of the several circuits, potential operative connections between said timing element and each of said solenoids adapted to effect the timed actuation of said solenoids, individual recording members adapted to be actuated by the plungers of the several solenoids when energized, and a common recording printometer operatively connected with each circuit, adapted to be actuated by the closure of either one of a pair of alternative current paths appurtenant to each solenoid and made available by the energization thereof.

In testimony whereof, we sign this specification in the presence of two witnesses.

ERVING A. LUEKY.
ROY N. HOUGHTON.

Witnesses:
WILLIAM M. SWAN,
RUBY E. RAUPP.